United States Patent [19]

Brumm

[11] 4,135,697

[45] Jan. 23, 1979

[54] LOW PRESSURE PILOT VALVE

[75] Inventor: Richard S. Brumm, Orinda, Calif.

[73] Assignee: Grove Valve and Regulator Company, Oakland, Calif.

[21] Appl. No.: 802,017

[22] Filed: May 31, 1977

[51] Int. Cl.² .............................................. F16K 31/12
[52] U.S. Cl. .................................... 251/50; 251/61.3; 137/489; 137/505.44
[58] Field of Search ................. 251/50, 61.3; 137/489, 137/505.21, 505.22, 505.23, 505.44

[56] References Cited

U.S. PATENT DOCUMENTS

| | | | |
|---|---|---|---|
| 429,591 | 6/1890 | Abbe | 137/505.21 |
| 527,902 | 10/1894 | Taafel | 137/505.21 X |
| 892,788 | 7/1908 | Wilkins | 251/61.3 X |
| 1,045,197 | 11/1912 | Echuler | 137/505.25 |
| 1,120,002 | 12/1914 | Walquist | 127/505.22 |
| 1,934,982 | 11/1933 | Jones | 137/505.22 X |
| 2,433,414 | 12/1947 | Annin | 137/505.44 X |
| 2,578,005 | 12/1951 | Glasgow | 137/505.22 |
| 2,770,441 | 11/1956 | Grove | 137/505.22 X |
| 2,955,614 | 10/1960 | Meynig | 137/505.22 X |
| 3,189,045 | 6/1965 | McCloud | 137/505.22 X |
| 4,026,513 | 5/1977 | Callenberg | 137/489 |

Primary Examiner—Harold W. Weakley
Attorney, Agent, or Firm—Melvin R. Stidham

[57] ABSTRACT

A pressure regulator valve including a poppet type valve carried by a plate, which in turn is biased by a diaphragm of considerable area. The diaphragm plate is adjustably spaced closely to the diaphragm chamber cover plate so that movement of the valve sufficient to enable flow, will consume much or all of the clearance, momentarily compressing the gas therein, and dampening valve operation to reduce chatter.

4 Claims, 1 Drawing Figure

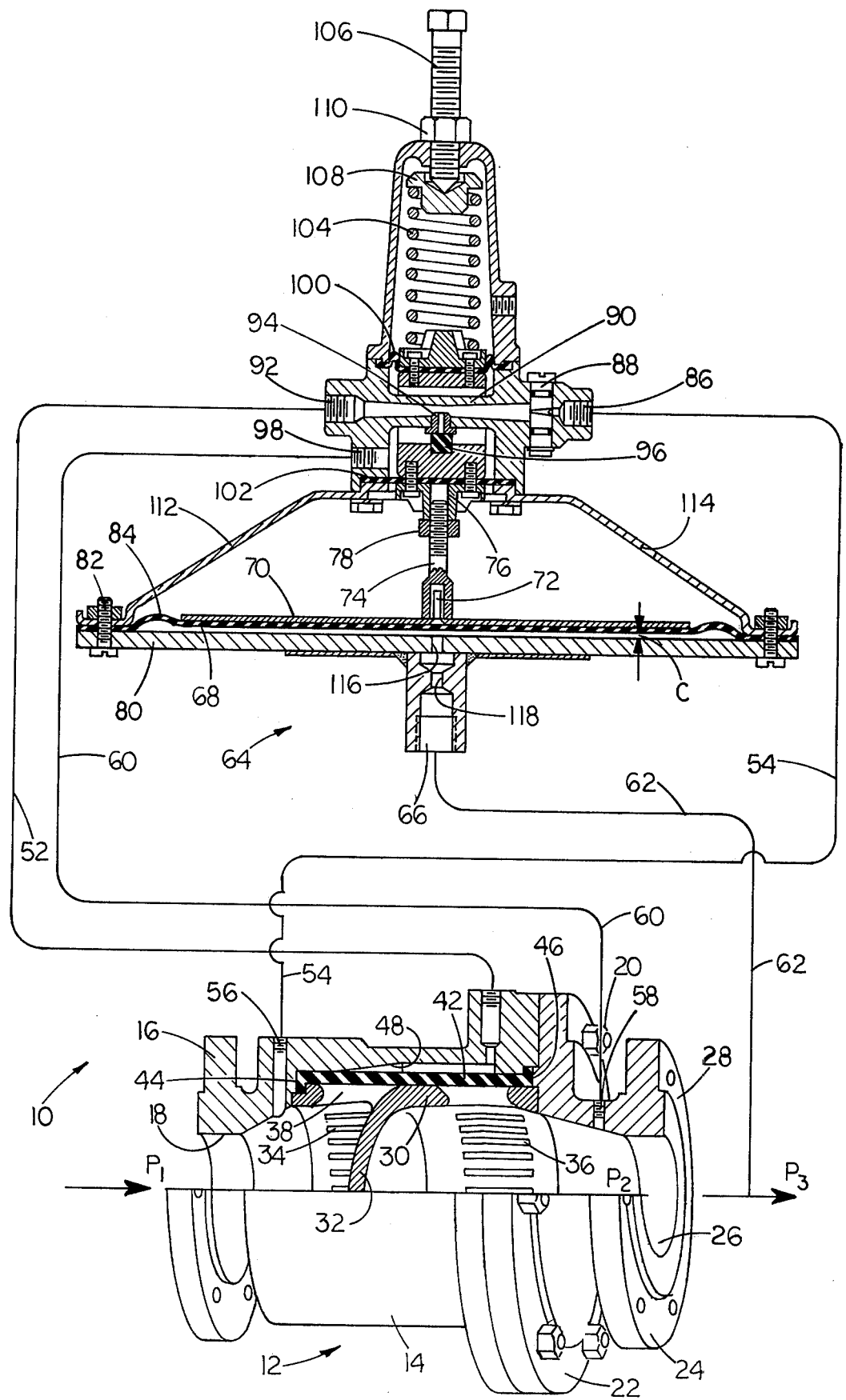

LOW PRESSURE PILOT VALVE

BACKGROUND OF THE INVENTION

In a commercially available pressure regulating system, pressure in a jacket surrounding a flexible tube is maintained at a level to prevent radial stretching of the tube for fluid flow as long as the monitored pressure in the pipeline is at the desired level. However, should the pressure in the pipeline being monitored deviate from that level, i.e. deteriorate where it is the pressure downstream of the valve that is being monitored, the jacket pressure is evacuated to enable the valve to open. Such evacuation is under control of a pilot valve wherein the pressure being monitored acts against a diaphragm in opposition to an adjusted spring force. Hence, should the spring force overcome the monitored pressure acting against the diaphragm, the pilot valve is opened and the chamber or jacket is evacuated. Then, when the desired pressure is again reached, the spring is overcome to close the pilot valve and allow the jacket pressure to build up again.

In practice, the system just described has proven highly satisfactory for most pressure control services. However, in some applications, as when seeking fine control at low pressure, difficulty has been experienced in maintaining stability of the sensitive pilot valve, resulting in valve chattering.

OBJECTS OF THE INVENTION

It is an object of this invention to provide a pilot valve for pressure control service having maximum stability in operation.

It is a further object of this invention to provide a highly sensitive diaphragm-operated valve which opens readily, but with movements dampened to reduce chattering.

Other objects and advantages of this invention will become apparent from the description to follow, particularly when read in conjunction with the accompanying drawing.

SUMMARY OF THE INVENTION

In carrying out this invention, there is provided a pilot valve having a hollow body with a tubular flow passage across the body. A port opens from a side of the tubular passage within the hollow body from which an outlet port opens, and a valve is urged to seat against the port by pressure acting against a diaphragm on which it is carried, the diaphragm being opposed by an adjustable spring. The diaphragm has an extremely large surface area, making it particularly sensitive to pressure sensing and is sealed around its edges in closely spaced parallel relationship to a cover plate. With the clearance between diaphragm plate and coverplate extremely small, e.g. no more than two or three times the length of the valve stroke, operation of the valve produces considerable momentary compression of the gas acting against the diaphragm, which compression dampens the valve movement and prevents chattering.

BRIEF DESCRIPTION OF THE DRAWINGS

The drawing is a more or less schmatic view, partially in section, showing a pressure regulating system including the pressure regulator valve of this invention.

DESCRIPTION OF A PREFERRED EMBODIMENT

Referring now to the drawing with greater particularity, there is shown a pressure regulating system 10 including an expansible tube type pressure regulator valve 12 having a generally cylindrical housing 14 with an upstream hub 16 provided with a central flow passage 18. Secured onto the downstream end of the housing 14, as by means of bolts 20 is a closure member 22 carrying a downstream hub 24 with an outlet flow passage 26 and a flange 28 for connection into a pipeline (not shown). A core sleeve 30 is positioned within the housing 14 and includes a dam or barrier 32 that extends completely across the inside thereof to prevent flow of fluid directly through the core sleeve. However, flow around the dam 32 is enabled through a spaced series of inlet and outlet slots 34 and 36 between ribs 38. The ribs 38 and an outer cylindrical sealing surface 40 of the barrier 32 are normally snugly embraced by an expansible tube or sleeve 42 stretched around them to seal. The expansible tube 42 has, at its upstream end, an inturned flange 44, which is clamped and sealed between the core sleeve 30 and the valve body 14, and, at the downstream end, an outturned flange 46 which is clamped between the body 14 and the downstream closure member 22. The inner surface of the regulator body 14 is tapered outward at 48 to form a control chamber or jacket 50 to which a control pressure fluid may be delivered through a duct 52.

In the regulator system 10 illustrated, the control or jacket pressure $P_1$ is tapped off through an upstream tap 54 connected to the fitting 56 opening into the upstream flow passage 18. A similar fitting 58 is provided in the downstream passage 26 whereby the control or jacket pressure fluid may be evacuated from the jacket 50 back through the load-unload duct 52 and transmitted through a dumping duct 60 into the low pressure zone $P_2$, as in the downstream flow passage 26 of the regulator valve 12. The pressure $P_3$ being monitored and controlled is conveniently tapped from a suitable location in the downstream pipeline (not shown) through a duct 62 to the pilot valve 64 of this invention.

Specifically, the monitored pressure $P_3$ is introduced to the pilot valve 64 through sensing port 66 to be asserted over the surface of a diaphragm 68 of considerable surface area of, say 50 square inches or more. Supported on the disphragm 68 is a diaphragm plate 70, which carries a guide pin 72 received in a valve push rod 74. The push rod 74 is threadedly received in a valve carrier member 76, and a lock nut 78 secures the push rod in an adjusted position thereon, as will be described. The diaphragm 68 is pressed around its periphery against a cover plate 80 by means of screws 82 to form a sealed diaphragm chamber 84.

Again, the expansible tube valve jacket 50 is loaded at upstream pressure $P_1$, through load line 54 opening at 86 to the pilot valve 64 to flow past a variable orifice device 88 and through a tubular flow passageway 90 to outlet 92. From outlet 92 the jacket 50 is loaded through line 52.

A valve port 94 opens through the side of the tubular passageway 90 whereby, when opened by retraction of a poppet type valve closure 96, which is supported on valve carrier 76, the jacket 50 is dumped through line 52, lateral dumping port 94, outlet port 98 and through line 60 to the inlet 58 as previously described. Balancing diaphragms 100 and 102 are both secured to the valve carrier 76 and enclose the through-passageway 90 and lateral port 94 so that fluid being discharged therefrom will act against the diaphragms in equal amounts and, therefore, will not influence operation of the main diaphragm 68 or the poppet 96.

A spring 104 acts against the top of the valve carrier 76 in opposition to the main diaphragm 68 and the spring force may be set by an adjustment screw 106 acting against a spring button 108 with a lock nut 110 securing the setting.

The diaphragm cover plate 64 is secured on a diaphragm case 112 which is open to the atmosphere at 114 to prevent entrapment of air or gases. Flow of gases from within the diaphragm chamber 84 out through the sensing port may be inhibited by a pair of restrictive orifices 116 and 118 arranged in series to dampen fluctuation of the diaphragm 68. In addition, the threaded engagement of the push rod 74 on the valve carrier enables the diaphragm plate 70 and diaphragm to be adjustably positioned with respect to the cover plate 80 for setting the clearance C between them.

The clearance C between diaphragm 68 and cover plate is kept very small, to a distance of no more than two or three times the stroke of the valve poppet 96 to permit full flow through the lateral port 94. For example, if full flow is realized with the poppet retracted through a stroke of 0.025 inches, the clearance C may be set to about 0.050 or twice the stroke. Then, the stroke of the valve 96 will, through push rod 74 and diaphragm plate 70 compress the sensing gas in the diaphragm chamber 84 until relieved through the sensing port 66, to one-half of its original volume and hence, momentarily to approach twice its normal pressure. This has an obvious dampening effect.

An even greater dampening effect can be achieved by setting the clearance C to the full stroke of the valve. With such setting, the diaphragm 68 will lie flat against the cover plate 80 when the valve is fully opened. This results in a vacuum or suction effect which resists closing stroke of the valve 96 enhancing the dampening action.

The pressure increase and suction just described, together with the provision of orifice restrictions 116 and 118 in tandem greatly reduces valve chatter and resultant diaphragm fatigue. It should be noted that the threaded, adjustable push rod enables the above described clearance adjustment without requiring close machining tollerances.

While this invention has been described in conjunction with a preferred embodiment thereof, it is obvious that modifications and changes therein may be made by those skilled in the art without departing from the spirit and scope of this invention, as defined by the claims appended hereto.

What is claimed as invention is:

1. A pressure regulator valve comprising:
   a valve body having a flow passageway therethrough;
   a valve port in said flow passageway;
   a valve closure member reciprocable into and out of sealing engagement with said valve port;
   adjustable biasing means urging said valve closure member away from said sealing engagement;
   a cover plate of large area secured to said valve body;
   a stem on said valve closure member;
   a diaphragm of large area carried on said stem in closely spaced, parallel relationship to said cover plate;
   said diaphragm being sealed around the periphery thereof to said cover plate to form a pressure chamber therewith whereby fluid pressure acts against one side of said diaphragm in opposition to said biasing means;
   the other side of said diaphragm being exposed to atmospheric pressure; and
   a sensing port through said cover plate adapted for connection to a pipeline for sensing pressure therein;
   a restricted orifice in said sensing port;
   means on said stem for adjusting the clearance between said diaphragm and said cover plate.

2. The pressure regulator valve defined by claim 1 wherein:
   the normal clearance between said plate diaphragm and said cover when said valve member is in closed position is no more than three times the stroke of said valve closure member to move to full open position.

3. A pressure regulator valve defined by claim 1 wherein:
   the normal clearance between said diaphragm and said cover plate when said valve member is in said closed position is approximately twice the stroke of said valve closure member to move to full open position.

4. The pressure regulator valve defined by claim 1 wherein:
   the normal clearance between said diaphragm and said cover plate when said valve member is in closed position is approximately equal to the stroke of said valve closure member to move to full open position.

* * * * *